US006739730B2

(12) United States Patent
Kobayashi

(10) Patent No.: US 6,739,730 B2
(45) Date of Patent: May 25, 2004

(54) OPTICAL PICKUP DEFORMABLE MIRROR

(75) Inventor: Shohei Kobayashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 10/277,484

(22) Filed: Oct. 22, 2002

(65) Prior Publication Data

US 2003/0095347 A1 May 22, 2003

(30) Foreign Application Priority Data

Nov. 20, 2001 (JP) ......................................... 2001-355136

(51) Int. Cl.[7] ................................................. G02B 5/08
(52) U.S. Cl. ........................ 359/846; 359/847; 359/848; 359/291; 359/292; 369/94; 369/112
(58) Field of Search ................................ 359/846, 847, 359/848, 291, 292; 369/94, 112

(56) References Cited

U.S. PATENT DOCUMENTS

| 5,202,875 A | 4/1993 | Rosen et al. |
| 5,719,846 A | 2/1998 | Matoba et al. |

*Primary Examiner*—Mohammad Sikder
(74) *Attorney, Agent, or Firm*—Scully, Scott Murphy & Presser

(57) ABSTRACT

The present invention provides an optical pickup deformable mirror used for correcting a spherical aberration caused by a difference in thickness of a cover glass of a recording medium, wherein the optical pickup deformable mirror is deformed into a rotation-symmetrical surface obtained by rotating a curve represented by the following expression f(r):

$$f(r) = ar^2 + g(r)$$

where r is the distance from the axis of rotational symmetry, a is an actual number except for 0, and g(r) satisfies $|g(r)| \leq 1$ µm.

5 Claims, 4 Drawing Sheets

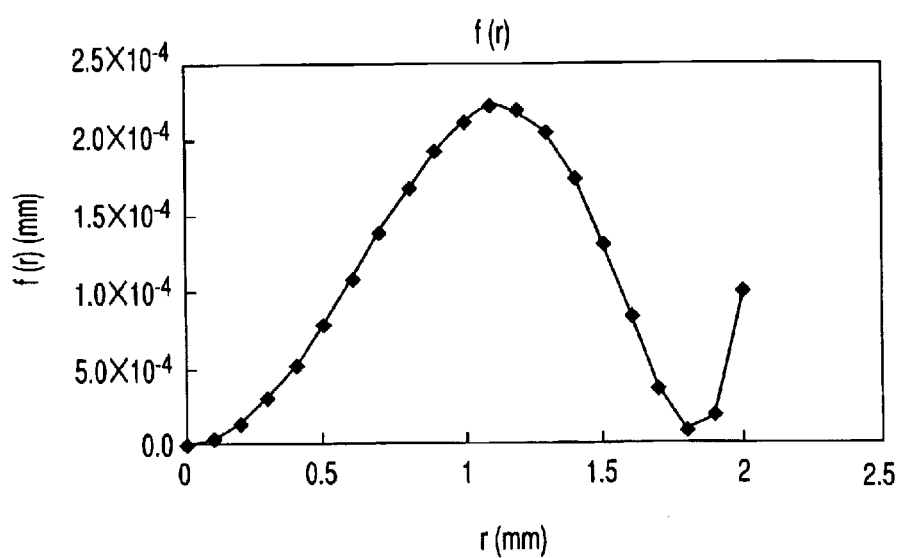
F I G. 7

OPTICAL PICKUP DEFORMABLE MIRROR

CROSS-REFERENCE TO RELATED APPLICATIONS

This application is based upon and claims the benefit of priority from the prior Japanese Patent Application No. 2001-355136, filed Nov. 20, 2001, the entire contents of which are incorporated herein by reference.

BACKGROUND OF THE INVENTION

1. Field of the Invention

The present invention relates to a deformable mirror for an optical pickup, which records/reproduces information onto/from a recording medium. More particularly, the present invention relates to an optical pickup deformable mirror used for correcting a spherical aberration involved in a change in thickness of a cover glass of a recording medium.

2. Description of the Related Art

Presently, in the field of optical pickups, light having a wavelength of approximately 650 nm and an objective lens having a numerical aperture (NA) of approximately 0.65 are generally used.

In order to achieve higher-density recording, reduction in wavelength of the light to be used or increase in NA of the objective lens are carried on. For example, in the case of next-generation optical pickups, use of light having a wavelength of approximately 405 nm and use of an objective lens having an NA of approximately 0.85 are contemplated.

The thickness of the cover glass of an optical recording medium usually has irregularities of approximately ±3 μm. Irregularities in the thickness of the cover glass generate a spherical aberration. The spherical aberration caused by irregularities of approximately ±3 μm in the thickness of the cover glass is not a problem with conventional optical pickups and can be ignored, but it cannot be ignored with next-generation optical pickups working at a short wavelength or having a large NA, and the spherical aberration must be thus corrected.

Further, another technique for achieving higher-density recording involves realizing multiple information recording layers. A multilayered optical recording medium usually has a plurality of information recording layers, which are located at intervals of approximately 20 μm.

For example, an optical pickup for a two-layered optical recording medium is optimally designed with reference to an intermediate position between the two information recording layers in order to minimize the spherical aberration generated. The optical pickup selectively reads/writes information from/onto the two information recording layers deviating from the optimum position by 10 μm. This corresponds to reading/writing information from/onto a recording medium having a cover glass whose thickness deviates from an optimum value by 10 μm.

Under such a condition, even if the conventional wavelength and NA are used, the spherical aberration caused by the difference in position of the information recording layers (in other words, the difference in thickness of the cover glass) can be no longer ignored, and hence correction must be carried out.

Use of a deformable mirror is proposed in order to correct the spherical aberration. The spherical aberration correction by the deformable mirror is disclosed in, for example, U.S. Pat. No. 5,202,875 or U.S. Pat. No. 5,719,846.

U.S. Pat. No. 5,719,846 teaches deformation of the mirror according to the expression (1), $f(r)=3.3168\times10^{-2}\cdot r^6-3.9542\times10^{-3}\cdot r^4-0.505\cdot r^2$, shown in the 23rd column. FIG. 6 shows a graph of this expression f(r). In the graph of FIG. 6, r is up to 2 mm, according to a description "Furthermore, since the diameter of a light beam, which is subjected to the aberration correction, is about 4 mm" in the 3rd column of the above-cited reference, and a unit of f(r) is mm.

Furthermore, this cited reference teaches deformation of the mirror according to the expression (2), $f(r)=-2.2\times10^{-1}+3.4868\times10^{-1}\cdot r^2-1.277\times10^{-1}\cdot r^4-1.6348\times10^{-2}\cdot r^6+7.0052\times10^{-3}\cdot r^8$, shown in the 23rd column. FIG. 7 shows a graph of this expression f(r). In the graph of FIG. 7, a constant term is omitted.

In U.S. Pat. No. 5,719,846, the mirror is deformed so as to cancel the optical path difference generated by the spherical aberration. That is, correction of the spherical aberration is attempted by reflecting a light ray incident upon the mirror so that an optical path difference proportional to the deformation of the mirror is introduced into the path of the light ray.

Deformation of the mirror not only corrects the optical path difference, but causes the direction of the reflected light ray to incline from the optimum direction. This inclination of the light ray moves the position of incidence upon the objective lens. Thus, the sufficient spherical aberration correction cannot be achieved by deformation of the mirror taking only the optical path difference into consideration.

U.S. Pat. No. 5,202,875 teaches, in the third paragraph of the 14th column, correction of the spherical aberration by using a Schmidt correction plate. However, this is also based on the principle similar to that of U.S. Pat. No. 5,719,846, and the spherical aberration can be corrected when the inclination of the reflected light ray is so small it can be ignored, but the sufficient spherical correction cannot be achieved when it is not.

BRIEF SUMMARY OF THE INVENTION

According to the present invention, there is provided an optical pickup deformable mirror used for correcting a spherical aberration caused by a difference in thickness of a cover glass of a recording medium (irregularities in thickness of the cover glass at respective parts of the same recording medium, irregularities in thickness of the cover glass between different recording mediums, or the difference in cover glass thickness due to the switching of recording layers in a multilayered recording medium), wherein the optical pickup deformable mirror is deformed into a rotation-symmetrical surface obtained by rotating a curve represented by the following expression f(r):

$$f(r)=ar^2+g(r)$$

where r is the distance from the axis of rotation symmetry, a is an actual number except for 0, and g(r) satisfies $|g(r)|\leq 1$ μm.

The optical pickup deformable mirror according to the present invention preferably satisfies $|g(r)|\leq 0.5$ μm.

The optical pickup deformable mirror according to the present invention more preferably satisfies $|ar^2|\leq 0.005$ mm.

The present invention provides an optical pickup deformable mirror, which can sufficiently correct a spherical aberration caused by a difference in thickness of a cover glass of a recording medium. The optical pickup deformable mirror according to the present invention can suppress not only generation of a spherical aberration but also occurrence of a comatic aberration by substantially deforming into a rotation-parabolic surface.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a graph showing another expression f(r), which determines deformation of the mirror disclosed in U.S. Pat. No. 5,719,846.

DETAILED DESCRIPTION OF THE INVENTION

A preferred embodiment according to the present invention will now be described hereinafter with reference to the accompanying drawings.

Figure 1:
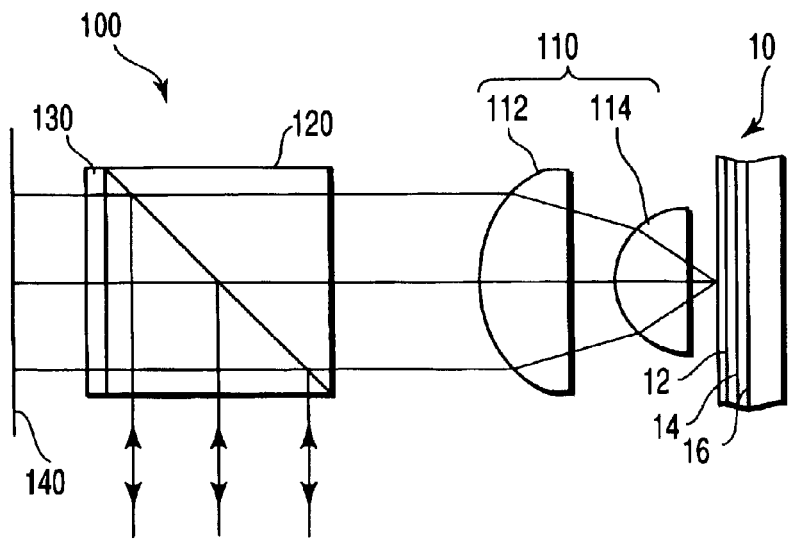
FIG. 1 schematically shows an example of an optical pickup including a shape-variable mirror according to the present invention.

As shown in FIG. 1, a recording medium or optical disk 10 includes three recording layers 12, 14 and 16. The recording layers 12, 14 and 16 are positioned at intervals of 20 $\mu$m, for example. The thickness of a cover glass relative to the recording layer 12 is, e.g., 0.08 mm, and hence the thickness of the cover glass relative to the recording layer 14 is 0.10 mm and the thickness of the cover glass relative to the recording layer 16 is 0.12 mm.

An optical pickup 100, which reads/writes information from/onto the optical disk 10, has an objective lens 110, a polarized beam splitter 120, a quarter wave plate 130 and a deformable mirror 140. The objective lens 110 comprises two lenses 112 and 114. The objective lens 110 has a numerical aperture (NA) of 0.85.

A read operation of the optical pickup 100 will now be described.

Light from a non-illustrated light source, e.g., a laser light source, has a wavelength of 405 nm, for example. It enters the polarized beam splitter 120 as S polarized light, is reflected by the polarized beam splitter 120, converted into the circularly polarized light by passing through the quarter wave plate 130, and reflected by the deformable mirror 140. The reflected light from the deformable mirror 140 is converted into P polarized light by again passing through the quarter wave plate 130, and transmitted through the polarized beam splitter 120 this time. The transmitted light from the polarized beam splitter 120 is focused on any one of the recording layers 12, 14 and 16 of the optical disk 10 by the objective lens 110.

The light that illuminates the corresponding recording layer is reflected with a modulation in accordance with information recorded thereon. The reflected light from the optical disk 10 is transmitted through the objective lens 110 and the polarized beam splitter 120, converted into the circularly polarized light by passing through the quarter wave plate 130, and reflected by the deformable mirror 140. The reflected light from the deformable mirror 140 is converted into the S polarized light by again passing through the quarter wave plate 130, and reflected by the polarized beam splitter 120. The reflected light from the polarized beam splitter 120 is utilized for reading information by a non-illustrated photodetector.

The optical pickup 100 is designed so that the aberration becomes minimum when the light having the wavelength of 405 nm is focused on the central recording layer 14. The optical pickup 100 is designed so that the axial aberration of the objective lens 110 becomes small, and so that the abaxial aberration also becomes small in consideration of an assembling error. Here, the axial aberration means an aberration when the principal ray of the light flux entering the objective lens 110 is parallel with an optical axis of the objective lens 110 and the light flux is converged onto the optical axis of the objective lens 110. Further, the abaxial aberration means an aberration when the principal ray of the light flux entering the objective lens 110 is inclined with respect to the optical axis of the objective lens 110 and the light flux is converged onto a position deviating from the optical axis of the objective lens 110.

When the deformable mirror 140 is flat, namely when the spherical aberration is not corrected, the light that is converged onto the recording layer 12 or the recording layer 16 has a large spherical aberration. TABLE 1 shows RMS values of a wavefront aberration in units of wavelength ($\lambda$). TABLE 1 shows wavefront aberrations of the light flux having the inclinations of 0 degree (axial), 0.3 degree (abaxial) and 0.5 degree (abaxial) with respect to the optical axis of the objective lens 110. The axial aberration is caused by the spherical aberration, and the abaxial aberration is caused mainly by the comatic aberration.

| Cover glass thickness (mm) | Axial (0 degree) wavefront aberration ($\lambda$) | Abaxial (0.3 degree) wavefront aberration ($\lambda$) | Abaxial (0.5 degree) wavefront aberration ($\lambda$) |
| --- | --- | --- | --- |
| 0.08 | 0.206 | 0.208 | 0.211 |
| 0.10 | 0.009 | 0.026 | 0.045 |
| 0.12 | 0.201 | 0.203 | 0.206 |

For correcting such spherical aberrations, in the optical pickup 100 according to the present invention, the deformable mirror 140 is deformed into a rotation-symmetrical surface. The changed shape can be expressed by a displacement from a reference flat plane. The reference flat plane is, for example, a plane that includes an intersection point of the axis of rotational symmetry and the deformable mirror and that is vertical to the axis of rotational symmetry. Furthermore, since the changed shape is rotationally symmetrical, the changed shape can be uniquely determined by specifying the changed shape in any radial direction of the deformable mirror 140, namely, a curve.

The curve in the radial direction of the changed shape of the deformable mirror 140 is expressed by the following expression f(r):

$$f(r)=ar^2+g(r)$$

where r is the distance from the axis of rotational symmetry, and a is an actual number except for 0. More specifically, a value of a depends on the thickness of the cover glass. In other words, it can be determined depending on the recording layer that is a target of reading.

The first term of the right side in the above expression is a function representing a parabola, and g(r) in the second term is a function representing the displacement from the parabola. By adding an appropriate constant, g(0)=0 can be always achieved.

In other words, the deformable mirror 140 is deformed into a rotation-symmetrical surface, which is obtained by rotating f(r) mentioned above, namely, a substantially rotation-parabolic surface.

The mirror of parabolic surface has an ideal focal point with respect to a parallel light flux incident thereon, i.e., a focal point having no aberration. Therefore, it can be considered that f(r) is desirably close to the parabola. In other words, it can be considered that |g(r)| is preferably small.

For such a reason, g(r) preferably satisfies $|g(r)| \leq 1$ μm. For example, the curve f(r) in the radial direction of the changed shape of the deformable mirror 140 can be represented by $$f(r)=ar^2+br^4+cr^6+dr^8.$$

The second, third and fourth terms of the right side correspond to g(r). Values of coefficients a to d are determined in accordance with the thickness of the cover glass. Respective values of the coefficients a to d (units r: mm, a: $mm^{-1}$, b: $mm^{-3}$, c: $mm^{-5}$, d: $mm^{-7}$) relative to respective thicknesses (0.08 mm, 0.10 mm, 0.12 mm) of the cover glass are as shown in TABLE 2.

|         | a                      | b                      |
|---------|------------------------|------------------------|
| 0.08 mm | $-1.17702 \times 10^{-3}$ | $-3.99127 \times 10^{-5}$ |
| 0.10 mm | $-1.32537 \times 10^{-3}$ | $-9.30105 \times 10^{-5}$ |
| 0.12 mm | $-6.17326 \times 10^{-4}$ | $-8.82514 \times 10^{-5}$ |
|         | c                      | d                      |
| 0.08 mm | $-1.30466 \times 10^{-5}$ | $4.03033 \times 10^{-6}$  |
| 0.10 mm | $-1.51188 \times 10^{-5}$ | $1.22019 \times 10^{-6}$  |
| 0.12 mm | $-2.13369 \times 10^{-5}$ | $-5.12548 \times 10^{-8}$ |

Figure 2:
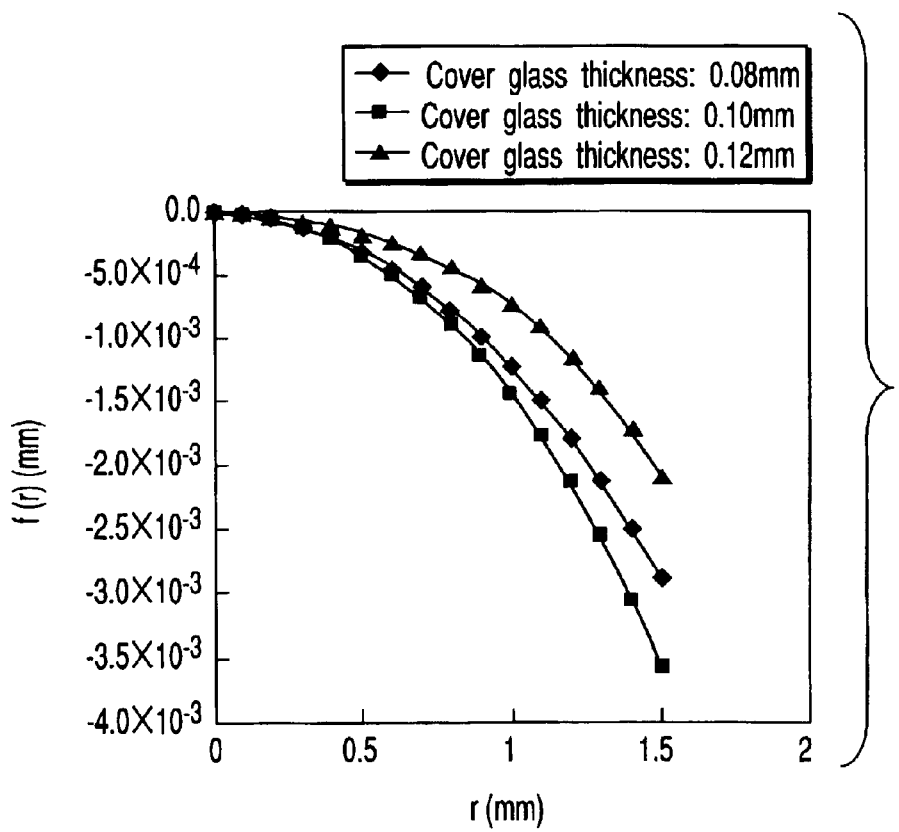
FIG. 2 shows a curve f(r), which can specify a changed shape of the shape-variable mirror according to the present invention.
Figure 3:
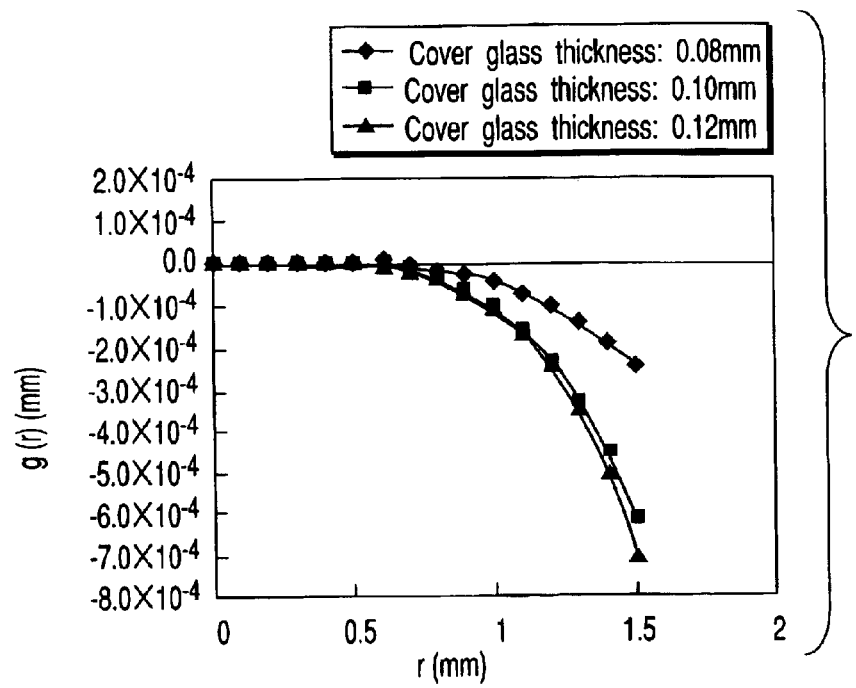
FIG. 3 shows g(r), which expresses deviation from a parabola of the curve f(r) illustrated in FIG. 2.

The curve f(r) is illustrated in FIG. 2. Moreover, FIG. 3 shows g(r) representing the displacement from the parabola.

TABLE 3 shows RMS values of the wavefront aberration of the light reflected by the mirror having the rotation-symmetrical surface specified by the curve f(r).

| Cover glass thickness (mm) | Axial (0 degree) wavefront aberration (λ) | Abaxial (0.3 degree) wavefront aberration (λ) | Abaxial (0.5 degree) wavefront aberration (λ) |
|---|---|---|---|
| 0.08 | 0.000 | 0.053 | 0.089 |
| 0.10 | 0.000 | 0.171 | 0.294 |
| 0.12 | 0.000 | 0.187 | 0.326 |

As apparent from TABLE 3, the axial spherical aberration can be made to 0λ. That is, if the incident light flux is parallel with the optical axis of the objective lens, the ideal spherical aberration correction is enabled. When the assembling error can be minimized, the preferable application is possible.

However, in case of the cover glass thickness of 0.10 mm, the aberration of the light flux having the inclination relative to the optical axis of the objective lens, namely, the abaxial aberration is increased all the more. This aberration is caused mainly by the comatic aberration as mentioned above. This can be said that f(r) deteriorates the primary abaxial aberration of the objective lens 110 because the displacement from the parabola is too large.

For such a reason, g(r) more preferably satisfies $|g(r)| \leq 0.5$ μm. For example, the curve f(r) in the radial direction of the changed shape of the deformable mirror 140 can be represented by $$f(r)=ar^2+br^4+cr^6+dr^8+er^{10}.$$

The second, third, fourth and fifth terms of the right side correspond to g(r). Values of the coefficients a to e are determined in accordance with the thickness of the cover glass. Respective values of the coefficients a to e (units r: mm, a: $mm^{-1}$, b: $mm^{-3}$, c: $mm^{-5}$, d: $mm^{-7}$, e: $mm^{-9}$) relative to respective thicknesses (0.08 mm, 0.10 mm, 0.12 mm) of the cover glass are as shown in TABLE 4.

|         | a                      | b                       | c                       |
|---------|------------------------|-------------------------|-------------------------|
| 0.08 mm | $-7.41398 \times 10^{-4}$ | $4.45702 \times 10^{-6}$   | $-2.11477 \times 10^{-5}$ |
| 0.10 mm | $1.11272 \times 10^{-4}$  | $-9.56444 \times 10^{-6}$  | $3.58871 \times 10^{-5}$  |
| 0.12 mm | $1.03904 \times 10^{-3}$  | $-2.93879 \times 10^{-5}$  | $1.37748 \times 10^{-4}$  |
|         | d                      | e                       |                         |
| 0.08 mm | $8.39809 \times 10^{-6}$  | $-1.06563 \times 10^{-7}$  |                         |
| 0.10 mm | $-2.50051 \times 10^{-5}$ | $5.99680 \times 10^{-6}$   |                         |
| 0.12 mm | $-9.53244 \times 10^{-5}$ | $2.05943 \times 10^{-5}$   |                         |

Figure 4:
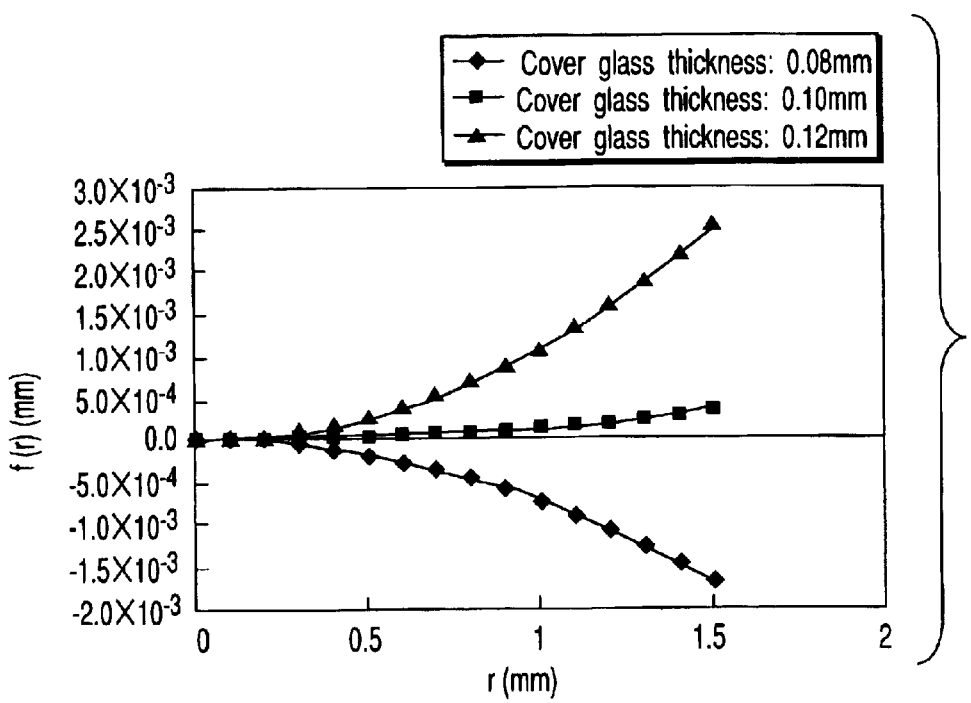
FIG. 4 shows another curve f(r), which can specify a changed shape of the shape-variable mirror according to the present invention.
Figure 5:
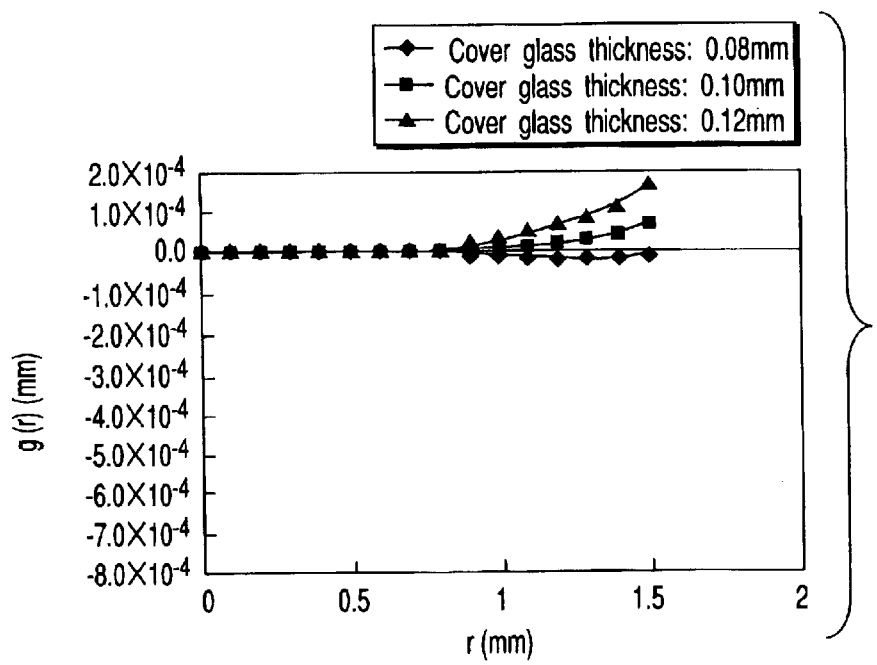
FIG. 5 shows g(r), which expresses deviation from a parabola of the curve f(r) illustrated in FIG. 4.
Figure 6:
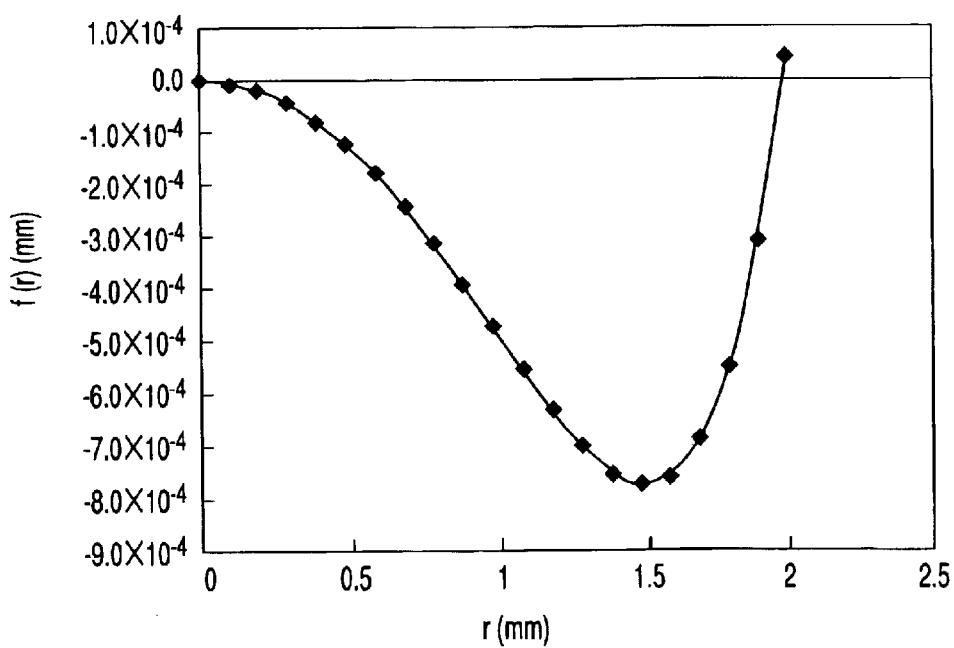
FIG. 6 is a graph of an expression f(r), which determines deformation of a mirror disclosed in U.S. Pat. No. 5,719,846.

FIG. 4 shows this curve f(r). In addition, FIG. 5 shows g(r) representing the displacement from the parabola.

TABLE 5 shows RMS values of the wavefront aberration of the light reflected by the mirror having the rotation-symmetrical surface specified by this curve f(r).

| Cover glass thickness (mm) | Axial (0 degree) wavefront aberration (λ) | Abaxial (0.3 degree) wavefront aberration (λ) | Abaxial (0.5 degree) wavefront aberration (λ) |
|---|---|---|---|
| 0.08 | 0.005 | 0.008 | 0.017 |
| 0.10 | 0.008 | 0.015 | 0.025 |
| 0.12 | 0.013 | 0.024 | 0.036 |

As apparent from TABLE 5, the axial spherical aberration is not completely corrected. That is, the spherical aberration is not 0λ, but it is sufficiently minimized. Additionally, the abaxial aberration, which is mainly the comatic aberration, is also sufficiently suppressed. When a certain degree of the assembling error must be allowed, namely, even if the light flux has the inclination with respect to the optical axis of the objective lens, preferable application is possible.

Further, more preferably, based on FIGS. 2 and 4, an absolute value $|ar^2|$ of the first term of the right side of f(r) is preferably less than or equal to 0.005 mm. In other words, a more preferably has a value that constantly satisfies $|ar^2| \leq 0.005$ mm.

Although the above has described the example of reading information, the same can be applied to writing information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical pickup deformable mirror used for correcting a spherical aberration caused by a difference in thickness of a cover glass of a recording medium, wherein the optical pickup deformable mirror is deformed into a rotation-symmetrical surface obtained by rotating a curve represented by the following expression f(r):

$$f(r)=ar^2+g(r)$$

where r is the distance from the axis of rotational symmetry, a is an actual number except for 0, and g(r) satisfies $|g(r)| \leq 1$ μm.

2. An optical pickup deformable mirror according to claim 1, wherein f(r) is represented by the following expression:

$$f(r)=ar^2+br^4+cr^6+dr^8$$

where the values of coefficients a to d are constants determined in accordance with a thickness of the cover glass.

3. An optical pickup deformable mirror according to claim 1, wherein g(r) satisfies $|g(r)| \leq 0.5$ μm.

4. An optical pickup deformable mirror according to claim 3, wherein f(r) is represented by the following expression:

$$f(r)=ar^2+br^4+cr^6+dr^8+er^{10}$$

where the values of coefficients a to e are determined in accordance with the thickness of the cover glass.

5. An optical pickup deformable mirror according to claim 1, wherein a has a value that satisfies $|ar^2| \leq 0.005$ mm.

* * * * *